United States Patent [19]

Kamemura

[11] Patent Number: 5,754,502
[45] Date of Patent: May 19, 1998

[54] ROTATING MAGAZINE TYPE DISK PLAYBACK DEVICE WITH ESCAPE PREVENTING RING AND AUXILIARY ACCESS

[75] Inventor: Takeshi Kamemura, Yao, Japan

[73] Assignee: Sanyo Electric Co., Ltd., Osaka, Japan

[21] Appl. No.: 757,512

[22] Filed: Nov. 27, 1996

[30] Foreign Application Priority Data

Nov. 29, 1995 [JP] Japan .................. 7-310603

[51] Int. Cl.$^6$ ............................................. G11B 17/22
[52] U.S. Cl. .................................. 369/37; 369/178
[58] Field of Search ................... 360/92, 98.04–98.06; 369/34, 36, 37, 178

[56] References Cited

U.S. PATENT DOCUMENTS

| | | | |
|---|---|---|---|
| 5,235,579 | 8/1993 | Ross | 369/37 |
| 5,577,010 | 11/1996 | Haque | 369/36 |
| 5,615,184 | 3/1997 | Tsuruta et al. | 369/37 |
| 5,671,196 | 9/1997 | Yoshida et al. | 369/34 |

FOREIGN PATENT DOCUMENTS 6-195842  7/1994  Japan.

*Primary Examiner*—Jefferson Evans
*Attorney, Agent, or Firm*—Armstrong, Westerman, Hattori, McLeland & Naughton

[57] ABSTRACT

A magazine for accommodating a plurality of disks positioned upright is rotatably mounted on a chassis covered with a cabinet. An escape preventing ring is provided above the chassis outside the magazine, and the cabinet is formed in a side wall thereof with an opening for withdrawing a disk from the magazine therethrough. The ring has a cutout portion positioned as opposed to a closure. Attached to the closure is a slipping-off preventing piece fittable in the cutout portion when the closure is fitted in the opening. A shaft provided upright in the vicinity of the opening carries an auxiliary gear meshable with an annular toothed face of the magazine. The slipping-off preventing piece has a projecting piece for moving the gear away from the toothed face when the closure is fitted in the opening.

3 Claims, 6 Drawing Sheets

1

ROTATING MAGAZINE TYPE DISK PLAYBACK DEVICE WITH ESCAPE PREVENTING RING AND AUXILIARY ACCESS

FIELD OF THE INVENTION

The present invention relates to disk playback devices of the so-called autochanger type adapted to accommodate a plurality of disks serving as recording media for playing back a selected or desired disk.

BACKGROUND OF THE INVENTION

Various autochanger-type playback devices have been proposed in which a plurality of disks are accommodated as positioned upright for playing back a desired one of the disks. The present applicant also has already proposed the device shown in FIGS. 6 and 7 (see JP-A-195842/1994). In the following description, the direction in which the disk is inserted will be referred to as "front," and the direction of discharge of the disk as "rear."

The illustrated device has a bowl like magazine 3 rotatably mounted on a chassis 2 for accommodating disks D. A disk insertion-discharge portion 4 and a playback portion 7 spaced apart from each other are arranged outside the path of rotation of the magazine 3. A cabinet 500 is fitted over the chassis 2 and covers the magazine 3, insertion-discharge portion 4 and playback portion 7.

The magazine 3 is formed with 24 disk spaces 31 arranged radially for accommodating disks D as positioned upright. Each of the spaces 31 has an open outer end in the shape of a slit 31a formed in the outer wall of the magazine 3 for permitting the disk to pass therethrough.

At the front side of the chassis 2, a front panel 20 having a rotary shutter 40 is provided externally of the insertion-discharge portion 4. The disk is placed into the magazine 3 through the rotary shutter 40 and the insertion-discharge portion 4.

With reference to FIG. 7, the magazine 3 has a bottom wall formed with an annular toothed face 35. A magazine drive motor M1 mounted on the chassis 2 is coupled to the toothed face 35 by way of two intermediate gears 330, 340. Two holes 350, 350 are formed in the intermediate gear 340 on a diametrical line thereof. A sensor SE15 is disposed on the path of revolution of the holes 350. With the rotation of the motor M1 and the intermediate gears 330, 340, the sensor SE15 first detects one of the holes 350 and thereafter detects the other hole 350. This indicates that the magazine 3 has rotated by one disk accommodating space pitch.

With the conventional device, however, the disk accommodated in the magazine 3 is likely to roll out from the magazine 3 if the device as installed is tilted in its entirety.

Further if the device malfunctions for one cause or another, rendering the magazine 3 unable to rotate, there arises a need to take out the disks from the magazine 3 before repairing. With the conventional device, it is then necessary to remove the cabinet 500 from the chassis 2 to expose the magazine 3 before taking out the disks, and the removal of the cabinet 500 requires labor. Especially if the device is large-sized in its entirety, the cabinet 500 is not removable efficiently.

SUMMARY OF THE INVENTION

An object of the invention is to prevent disks from rolling or slipping off when the device is installed as tilted in its entirety.

Another object of the invention is to make it possible to readily withdraw disks from the magazine even when the magazine 3 is not rotatable electrically.

Outside the path of rotation of a magazine 3, an escape preventing ring 300 is provided above a chassis 2 for preventing disks D from slipping off from the magazine 3. A side wall of a cabinet 500 is provided with an opening 510 opposed to the peripheral wall of the magazine 3 for withdrawing each disk D from the magazine 3 therethrough. A closure 520 is fitted in the opening 510. The escape preventing ring 300 has a cutout portion 305 positioned as opposed to the closure 520. The closure 520 has attached thereto a slipping-off preventing piece 530 fittable in the cutout portion 305 to become continuous with the ring 300.

Between the closure 520 and the magazine 3, a shaft 700 is mounted upright on the chassis 2 and rotatably carries an auxiliary gear 710 which is slidable upward and downward on the shaft 700. The auxiliary gear 710 is biased upward by a compression spring 720 disposed between the gear 710 and the chassis 2, and is usually in mesh with an annular toothed face 35 of the magazine. The closure 520 is provided on its inner side with a projection 540 extending downward. The closure 520 is fitted into the opening 510 with the projection depressing the auxiliary gear 710.

When the closure 520 is fitted to the cabinet 500, the slipping-off preventing piece 530 is fitted in the cutout portion 305 of the escape preventing ring 300 and becomes continuous with the ring 300. Even if the device is installed as tilted in its entirety, the disks within the magazine 3 are retained by the escape preventing ring 300 or the slipping-off preventing piece 530, and are unlikely to roll out from the magazine 3. When the closure 520 is removed, exposing the opening 510, the slipping-off preventing piece 530 is away from the escape preventing ring 300, so that a disk can be taken out from the magazine 3 through the cutout portion 305.

Further when the closure 520 is removed from the cabinet 500, the auxiliary gear 710 is raised by the force of the spring 720 into meshing engagement with the annular toothed face 35 of the magazine 3. The magazine 3 is then rotatable by manually rotating the gear 710 through the opening 510. With the desired space 31 brought to the position of the opening 510, the disk in the space 31 can be withdrawn therefrom through the opening 510. Accordingly, the disks can be taken out from the magazine 3 without necessitating the cumbersome manual procedure of removing the cabinet 500.

DETAILED DESCRIPTION OF THE PREFERRED EMBODIMENT

An embodiment of the invention will be described below with reference to the drawings.

Figure 1:
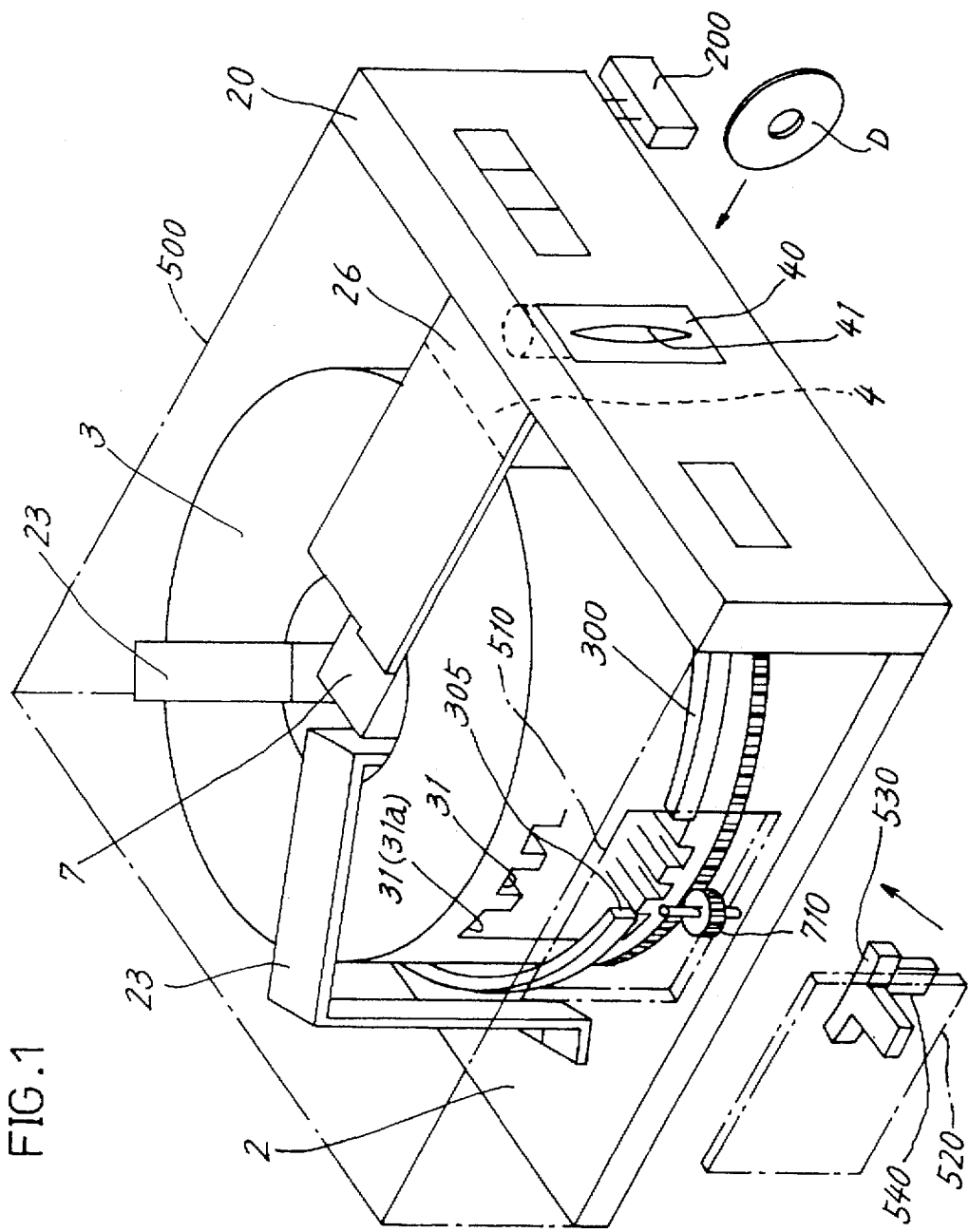
FIG. 1 is a view schematically showing a disk playback device.
Figure 2:
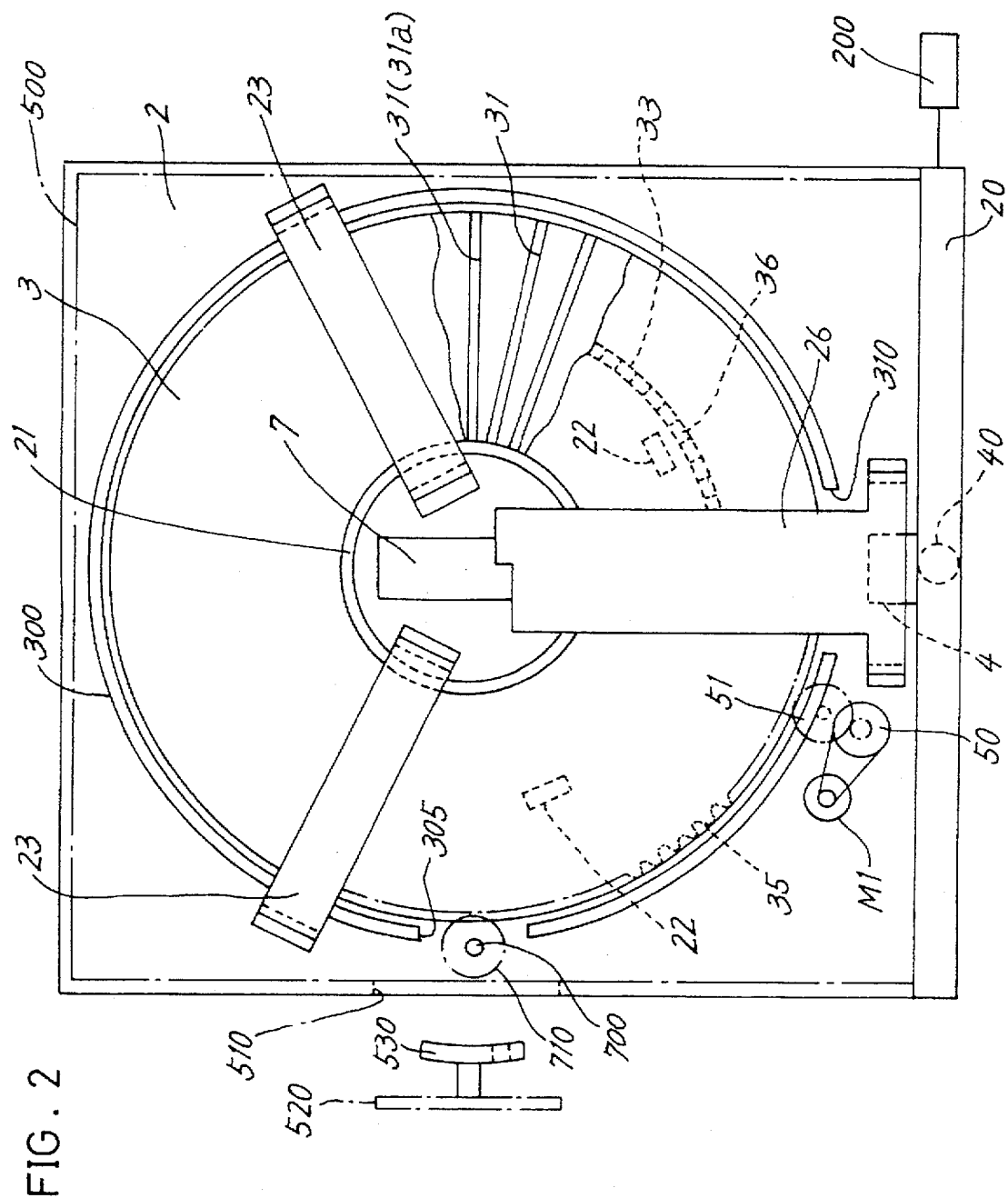
FIG. 2 is a plan view of the same.

FIG. 1 is a perspective view of the embodiment, i.e., a disk playback device, and FIG. 2 is a plan view of the same. As in the prior art, a front panel 20 provided at the front side of a chassis 2 has connected thereto a processor 200 having various command signals stored therein. A rotary shutter 40 is disposed in the center of the front panel 20. Formed in the center of the front panel 20 is an opening 41 for passing a disk D therethrough.

A hollow cylindrical support post 21 is mounted upright on the chassis 2. Rotatably fitted around the post 21 is a magazine 3 in the form of a double cylinder for accommodating a plurality of disks D in a radial arrangement. The magazine 3 has a hollow portion, in which a playback portion 7 is disposed.

An insertion-discharge portion 4 and the playback portion 7 are arranged in alignment with the center of rotation of the magazine 3 so as to shorten the distance from the portion 4 to the portion 7. A mechanism for transporting the disk between the insertion-discharge portion 4 and the playback portion 7 is known and will not be described in detail.

A cabinet 500 provided over the chassis 2 covers the magazine 3, playback portion 7 and insertion-discharge portion 4. The cabinet 500 is formed in a side wall thereof with an opening 510 for withdrawing the disk from the magazine 3 therethrough, and a closure 520 is fitted in the opening 510. Although FIG. 1 shows the closure 520 as being removable from the opening 510, the closure may be pivoted to the lower end of the opening portion 510.

Attached to the chassis 2 are holding brackets 23, 23 extending over the magazine 3 from its hollow portion to the outer side thereof and a bracket 26 providing the insertion-discharge portion 4. The magazine 3 is prevented from slipping off upward by the three brackets 23, 23, 26.

Figure 4:
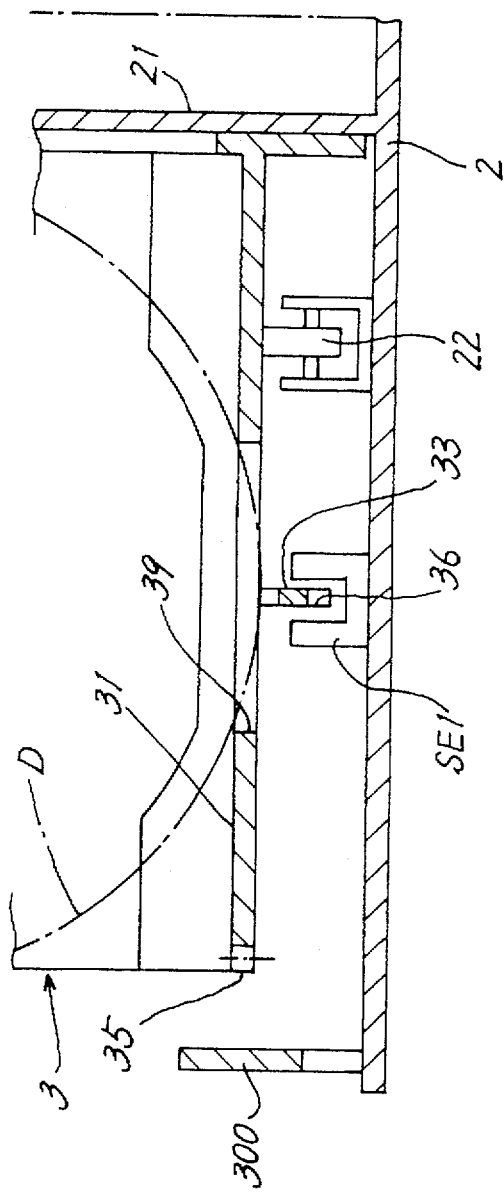
FIG. 4 is a side elevation partly broken away and showing a magazine.

Outside the path of rotation of the magazine 3, an escape preventing ring 300 surrounding a lower end portion of the magazine 3 is provided above the chassis 2 (see FIG. 4). The disks in the magazine 3 are prevented from slipping off therefrom to the outside by the ring 300 even if the device is installed as tilted in its entirety. The escape preventing ring 300 is formed with a cutout 310 and a cutout portion 305 at the portions thereof opposed to the location where the insertion-discharge portion 4 is provided and to the closure 520, respectively. Attached to the closure 520 is a slipping-off preventing piece 530 fitting in the cutout portion 305.

The magazine 3 has a plurality of disk spaces 31 arranged radially for holding therein respective disks as positioned upright. Each of the disk spaces 31 has an open outer end in the shape of a slit a formed in the outer wall of the magazine 3 for permitting the disk to pass therethrough. An annular toothed face 35 is formed on the periphery of lower end of the magazine 3.

A motor M1 for rotating the magazine 3 is disposed outside the path of rotation of the magazine 3 and below the escape preventing ring 300. The motor M1 is coupled to the toothed face 35 of the magazine 3 by two double gears 50, 51. The rotation of the motor M1 is transmitted to the magazine 3 via the double gears 50, 51.

FIG. 4 is a sectional view showing the magazine 3 as partly broken away. The disk space 31 of the magazine 3 has a holding groove 39 extending radially of the magazine 3. The disk has its lower end fitted in the groove 39 and is thereby held. Support tires 22 are mounted on the chassis 2. The magazine 3 is supported by the tires 22 and thereby made smoothly rotatable on the chassis 2. The magazine 3 has a rib ring 33 concentric therewith and projecting downward from the bottom wall of the magazine 3. The rib ring 33 is formed with apertures 36 equal in number to the number of disk spaces 31 and arranged at equal spacings. Sensor means SE1 opposed to the path of rotation of the rib ring 33 is mounted on the chassis 2. With the rotation of the magazine 3, the sensor means SE1 detects the number of apertures 36 moving past to detect the number of disk spaces 31 which are moved past by the rotation of the magazine 3.

Figure 3A:
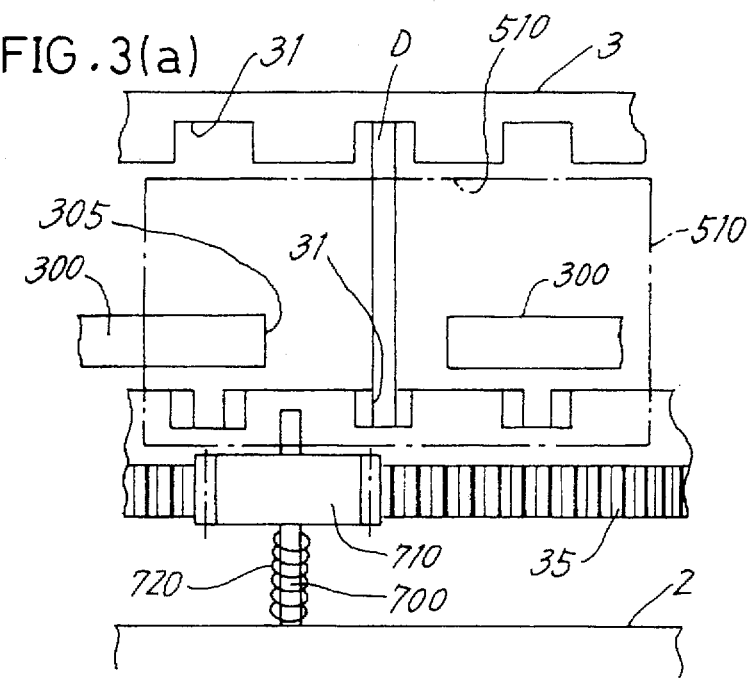
FIG. 3(a) is a side elevation showing the same with a closure removed from a cabinet.
Figure 5A:
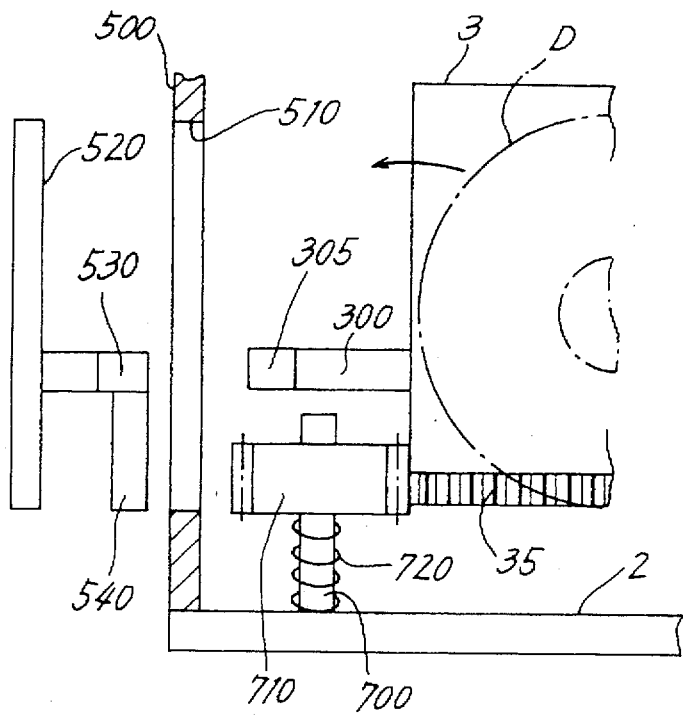
FIG. 5(a) is a front view partly broken away and showing the device with the closure positioned away from the cabinet.

With reference to FIGS. 1, 3 and 5, positioned inwardly of the cutout portion 305 of the escape preventing ring 300 is a shaft 700 mounted upright on the chassis 2 and rotatably carrying an auxiliary gear 710 meshing with the toothed face 35 of the magazine 3 and slidable upward and downward on the shaft 700. A compression spring 720 is fitted around the shaft 700 and positioned between the gear 710 and the chassis 2. While the closure 520 is not fitted in the opening 510 of the cabinet 500, the auxiliary gear 710 is in mesh with the toothed face 35 of the magazine 3 by being biased by the spring 720 as seen in FIGS. 3(a) and 5(a). The shaft 700 has a washer (not shown) in contact with the upper surface of the gear 710 for preventing the gear 710 from slipping off the shaft 700.

Figure 3B:
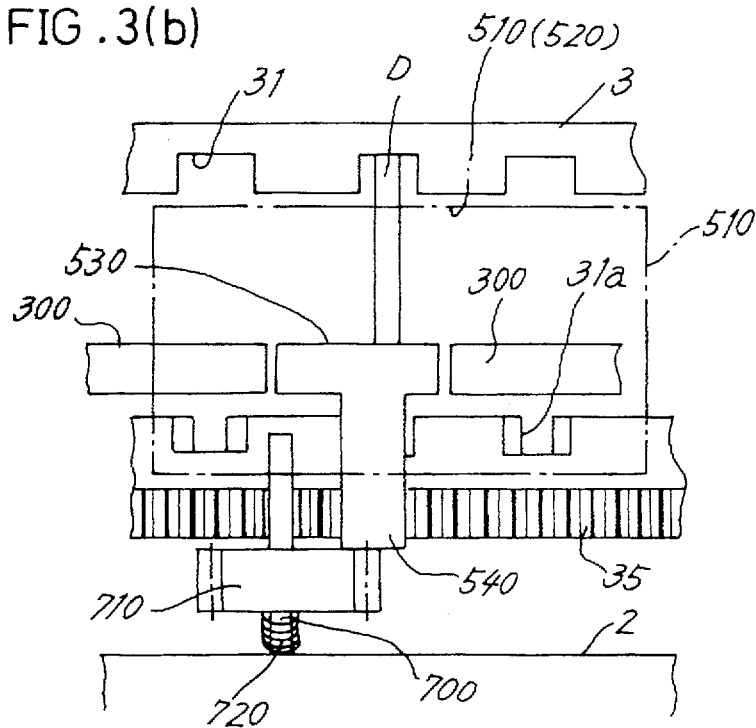
FIG. 3(b) is a side elevation showing the same with the closure fitted in an opening.
Figure 5B:
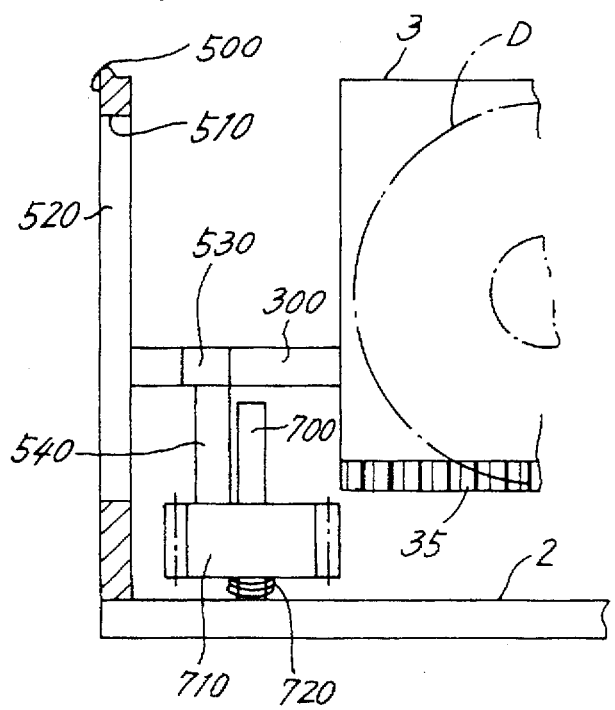
FIG. 5(b) is a front view partly broken away and showing the same with the closure fitted in the opening.
Figure 6:
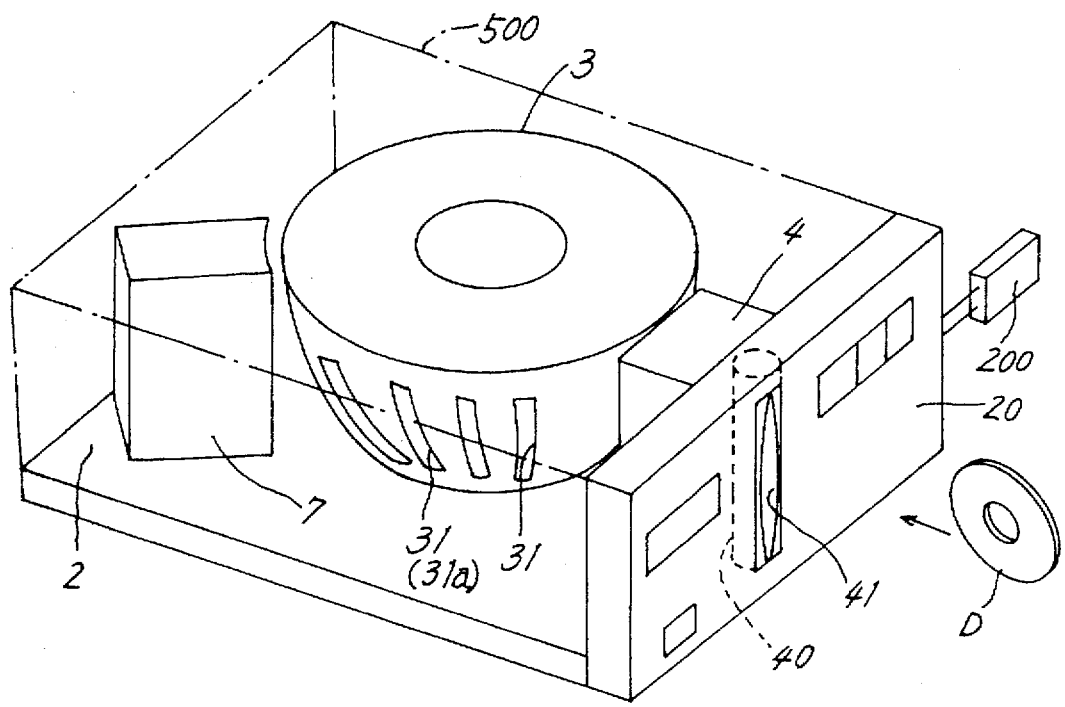
FIG. 6 is a perspective view showing a conventional disk playback device.
Figure 7:
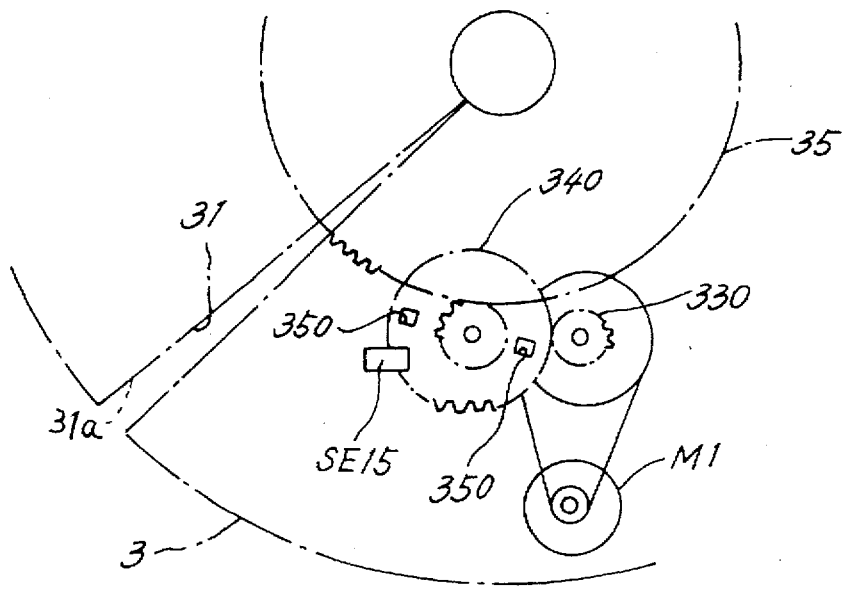
FIG. 7 is a plan view of the same.

The escape preventing piece 530 attached to the inner side of the closure 520 has a projecting piece 540 extending downward from the lower face of the piece toward the upper surface of the auxiliary gear 710. With the closure 520 fitted in the opening 510, the projecting piece 540 depresses the gear 710 against the compression spring 720 out of meshing engagement with the toothed face 35 of the magazine 3 as shown in FIGS. 3(b) and 5(b). In this state, the slipping-off preventing piece 530 fits in the cutout portion 305 of the escape preventing ring 300 and becomes continuous with the ring 300.

When the device is to be used in the usual manner, the closure 520 is fitted into the opening 510 in the cabinet 500, causing the projecting piece 540 to depress the auxiliary gear 710 against the force of the spring 720. The magazine 3 is smoothly rotatable free of the rotational load of the gear 710 since the toothed face 35 of the magazine 3 is out of meshing engagement with the gear 710.

When the device has developed a trouble with the motor M1 becoming inoperative for one cause or another, there may arise a need to take out the disks from the magazine 3 for repairing.

In this case, the closure 520 is first removed from the cabinet 500 to expose the opening 510 as shown in FIGS. 3(a) and 5(a). With the slipping-off preventing piece 530 removed from the cutout portion 305, the disk becomes reciprocatingly movable between the magazine 3 and the opening 510.

The serviceman then inserts his fingers into the opening 510 and manually rotates the gear 710 to rotate the magazine 3. When the disk space 31 accommodating the disk to be withdrawn is positioned as opposed to the opening 510, the disk is held with his fingers, passed through the cutout portion 305 and taken out from the opening 510.

With the present embodiment, the disk is thus removable from the magazine 3 without necessitating the manual procedure of removing the cabinet 500 before repairing. Especially when the magazine 3 is adapted to accommodate a large number of disks, the magazine 3 and the cabinet 500 are invariably large-sized, so that the invention assures convenience in repairing the device.

The magazine 3 may be made directly rotatable manually without providing the shaft 700 and the auxiliary gear 710. Although the serviceman then needs to insert his fingers deep into the cabinet 500, the absence of the shaft 700 and the gear 710 results in a reduction in the number of components.

What is claimed is:

1. A disk playback device comprising a chassis covered with a cabinet, a magazine rotatably mounted on the chassis for accommodating a plurality of disks positioned upright in a radial arrangement, the magazine being formed with an annular toothed face in mesh with a rotatingly driving gear mechanism, and means for normally inserting and withdrawing disks through said cabinet to and from said magazine, the disk playback device being characterized in that an escape preventing ring for preventing the disks from escaping from the magazine is provided above the chassis around the magazine, the cabinet being formed in a side wall thereof with an opening opposed to a peripheral wall of the magazine for withdrawing a disk from the magazine therethrough, the opening normally being covered with a closure, the escape preventing ring having a cutout portion positioned as opposed to the closure, and the closure having attached to an inner surface thereof a slipping-off preventing piece fittable in the cutout portion to become continuous with the escape preventing ring when the closure is fitted into the opening.

2. A disk playback device as defined in claim 1 wherein a shaft is mounted upright on the chassis outside a path of rotation of the magazine and positioned in the vicinity of the opening in the cabinet, and an auxiliary gear meshable with the annular toothed face of the magazine is mounted on the shaft movably along the shaft and biased by a spring toward the annular toothed face, the closure being formed with a projection for moving the auxiliary gear away from the annular toothed face against the spring when the closure is fitted into the opening.

3. A disk playback device as defined in claim 2 wherein the projection is a projecting piece extending from the slipping-off preventing piece.

* * * * *